US012524744B2

(12) United States Patent
Nvs et al.

(10) Patent No.: US 12,524,744 B2
(45) Date of Patent: *Jan. 13, 2026

(54) ARTIFICIAL INTELLIGENCE BASED DETERMINATION OF DAMAGE TO PHYSICAL STRUCTURES VIA VIDEO (71) Applicant: Genpact USA, Inc., New York, NY (US)

(72) Inventors: Abhilash Nvs, Bhubaneswar (IN); Adrita Barari, West Bengal (IN); Ankit Sati, New Delhi (IN); Payanshi Jain, Jaipur (IN); Chirag Jain, Bangalore (IN); Sreekanth Menon, Bangalore (IN)

(73) Assignee: Genpact USA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,607

(22) Filed: Jun. 11, 2024

(65) Prior Publication Data
US 2024/0428204 A1 Dec. 26, 2024

Related U.S. Application Data (63) Continuation of application No. 17/080,563, filed on Oct. 26, 2020, now Pat. No. 12,039,501.

(51) Int. Cl.
G06Q 10/20 (2023.01)
G06F 18/24 (2023.01)
(Continued)

(52) U.S. Cl.
CPC ............ *G06Q 10/20* (2013.01); *G06F 18/24* (2023.01); *G06N 20/20* (2019.01);
(Continued)

(58) Field of Classification Search
CPC .... G06Q 10/20; G06Q 30/0283; G06F 18/24; G06N 20/20; G06T 7/11;
(Continued)

(56) References Cited

U.S. PATENT DOCUMENTS 8,510,196 B1 * 8/2013 Brandmaier ........... G06Q 40/08
705/35
2010/0153143 A1 6/2010 Baggett et al.
(Continued)

OTHER PUBLICATIONS

X. Zhu, S. Liu, P. Zhang and Y. Duan, "A Unified Framework of Intelligent Vehicle Damage Assessment based on Computer Vision Technology," 2019 IEEE 2nd International Conference on Automation, Electronics and Electrical Engineering (AUTEEE), Shenyang, China, 2019, pp. 124-128. (Year: 2019).*

(Continued)

*Primary Examiner* — Carrie S Gilkey
(74) *Attorney, Agent, or Firm* — Goodwin Procter LLP (57) ABSTRACT A method and system are provided for assessing damage to a structure. According to one embodiment, the method includes detecting one or more external parts of the structure from a video of the structure using a first machine learning (ML) module trained to identify in one or more frames of a video of a structure an external part of the structure. The method also includes using a second ML module, trained to detect and classify damaged regions of a structure from one or more frames of the video: (i) identifying one or more damaged regions of the structure, and (ii) classifying the one or more damaged regions based on damage types. The method further includes associating the one or more damaged regions and corresponding damage types with the one or more external parts, providing a respective vision-based damage estimate for each of the one or more external parts.

20 Claims, 8 Drawing Sheets (51) Int. Cl.
*G06N 20/20* (2019.01)
*G06Q 30/0283* (2023.01)
*G06T 7/11* (2017.01)
*G06V 20/40* (2022.01)
*G10L 15/08* (2006.01)
*G10L 15/22* (2006.01)

(52) U.S. Cl.
CPC ............ *G06Q 30/0283* (2013.01); *G06T 7/11* (2017.01); *G06V 20/41* (2022.01); *G06V 20/46* (2022.01); *G06V 20/49* (2022.01); *G10L 15/08* (2013.01); *G10L 15/22* (2013.01); *G06T 2207/10016* (2013.01); *G10L 2015/088* (2013.01)

(58) Field of Classification Search
CPC .......... G06T 2207/10016; G06V 20/41; G06V 20/46; G06V 20/49; G10L 15/08; G10L 15/22; G10L 2015/088
See application file for complete search history.

(56) References Cited

U.S. PATENT DOCUMENTS

| | | | |
|---|---|---|---|
| 2015/0296228 A1* | 10/2015 | Chen | H04N 21/8126 |
| | | | 725/34 |
| 2017/0148102 A1 | 5/2017 | Franke et al. | |
| 2019/0073641 A1* | 3/2019 | Utke | G06T 7/0004 |
| 2020/0034958 A1* | 1/2020 | Campbell | G06Q 40/08 |
| 2022/0005121 A1* | 1/2022 | Hayward | G06N 3/044 |
| 2022/0058701 A1 | 2/2022 | Fuchs | |

OTHER PUBLICATIONS

Zhu, X. et al. "A Unified Framework of Intelligent Vehicle Damage Assessment based on Computer Vision Technology," 2019 IEEE 2nd International Conference on Automation, Electronics and Electrical Engineering (AUTEEE), Shenyang, China, (2019), pp. 124-128.

* cited by examiner (PRIOR ART)
Figure 1

Table: Consolidated Damage Information

| Frame No./Range | Part Name | Damage Name | Confidence |
|---|---|---|---|
| 30-45 | Part_x | Damage_x | Conf_x |
| 72 | Part_x | Damage_y | Conf_y |
| 900 | Pary_y | Damage_z | Conf_z |
| 1000-1100 | Part_z | ... | ... |
| ... | ... | ... | ... |
| ... | ... | ... | ... |

Figure 8

ARTIFICIAL INTELLIGENCE BASED DETERMINATION OF DAMAGE TO PHYSICAL STRUCTURES VIA VIDEO

CROSS REFERENCE TO RELATED APPLICATION(S)

This application is a continuation of and claims priority to and benefit of U.S. patent application Ser. No. 17/080,563, filed on Oct. 26, 2020, which is incorporated by reference herein in its entirety.

FIELD

This disclosure generally relates to artificial intelligence (AI) based/machine learning (ML) techniques and, in particular, to training and use of AI/ML systems to: determine damage to physical structures and estimate the effort required to repair the damage by analyzing videos of the physical structures.

BACKGROUND

Physical structures, such as vehicles, boats, machinery in industrial plants, buildings, etc. often get damaged due to collisions, other accidents, storms, etc. One way to assess the damage and to determine whether repairing the structure is viable and, if so, the kinds of repair needed, is to have one or more inspectors to inspect the structure. This can be impractical and/or time consuming in many cases. Another way to do this analysis is to take images (photographs, generally) of the damaged structure and to evaluate the images manually to assess the damage and to determine the required repairs. This process can also be laborious and time consuming. It may also require capturing the images of the damaged structure according to certain specified standards, such as required light, permitted angles and zoom, etc., so as to facilitate accurate determination of the damage. Moreover, a base image of the structure prior to the damage may also be required to assess the damage. This can increase the complexities and delays associated with the manual review of images.

SUMMARY

Methods and systems for training AI/ML systems and use of such systems for performing analysis of video and, optionally, of any associated audio, so that damage to physical structure can be determined accurately and efficiently, and the cost of repairing can be predicted, are disclosed. According to one embodiment, a method is provided for assessing damage to a structure. The method includes detecting one or more external parts of the structure from a video of the structure using a first machine learning (ML) module trained to identify in one or more frames of a video of a structure an external part of the structure. The method also includes using a second ML module, trained to detect and classify damaged regions of a structure from one or more frames of the video: (i) identifying one or more damaged regions of the structure, and (ii) classifying the one or more damaged regions based on damage types. The method further includes associating the one or more damaged regions and corresponding damage types with the one or more external parts, providing a respective vision-based damage estimate for each of the one or more external parts.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

DETAILED DESCRIPTION

The following disclosure provides different embodiments, or examples, for implementing different features of the subject matter. Specific examples of components and arrangements are described below to simplify the present disclosure. These are merely examples and are not intended to be limiting.

Various embodiments described herein feature a technique for processing and analysis of video of a physical structure and, optionally, the associated audio, in order to assess damage to the structure. The analysis is performed by an artificial intelligence (AI) based/machine learning (ML) module (referred to as AI/ML module) trained to isolate and identify from a video one or more parts of the structure. The AI/ML module is also trained to detect structural changes, such as damage to the structure, in the identified part(s). The discussion below uses a vehicle/car as an example of a physical structure that is analyzed and assessed, for the sake of convenience only. Embodiments of the technique are not so limited, however, and can be used to isolate and analyze changes in or damage to other structures, such as machinery, buildings, boats, etc.

Figure 1:
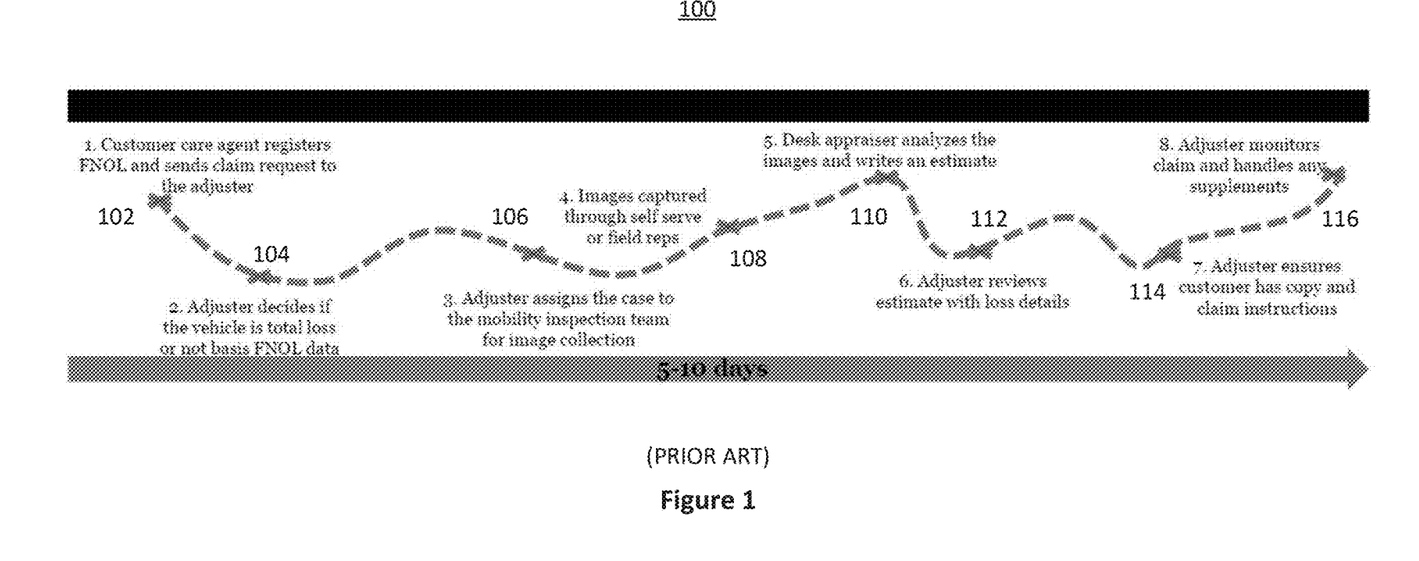
FIG. 1 illustrates a typical, conventional process used by some insurers to process a first notice of loss (FNOL)

When a vehicle accident occurs, the persons involved typically call the insurance carrier and file a First Notice of Loss (FNOL), which helps determine the extent of damage to the vehicle, and, subsequently, the liability and/or proper coverage for the required repairs. FIG. 1 illustrates the timeline of a typical, conventional FNOL handling process 100 for processing insurance claims for damaged vehicles. In the process 100, an agent of the insurance carrier receives the FNOL and forwards it to an adjuster, at step 102. Using the information about the accident included in the FNOL, the adjuster may decide in step 104 whether the vehicle should be declared a total loss or may be repaired.

Upon determining that the vehicle is repairable, the damage thereto must be assessed, so in the optional step 106 the adjuster sends one or more inspectors to obtain images of the vehicle, sometimes at the scene of the accident or elsewhere. In some cases, rather than sending inspector(s) to obtain the images, the adjuster may decide to use the images of the vehicle obtained by the vehicle user or owner. The pictures taken by the inspector or the user/owner of the vehicle are received in step 108. Thereafter, in step 110, a human appraiser reviews the images, assesses the damage to the vehicle, and obtains a cost estimate to repair the vehicle. In step 112, the adjuster reviews the estimate, the details of the repairs needed, and the repairs that may be covered, and then advises the customer (e.g., the user/owner of the vehicle) of the approved repairs and instructions on having those repairs made, in step 114. The whole process usually takes a few days or even weeks. In the optional step 116, the adjuster may monitor the claim and process any supplemental requests for repair.

Some embodiments of a technique described herein feature artificial intelligence/machine learning enabled computer vision and analysis, along with optional speech analysis, so that different parts and/or components of a physical structure are recognized from a video of the structure. The video includes a visual component and an optional audio component. Any damaged parts and/or components of the structure may be identified, and the severity of the damage can be assessed automatically. An audio recording associated with the video may be used to supplement and/or validate the assessment. Then, based on the nature of the damage and using external data sources (e.g., vehicle history, replacement part data, etc.,) repair cost can be estimated via Machine Learning models. The external data may include meta information such as make, model, year, body type (sedan, truck, hatchback, etc.), odometer reading, etc., of the vehicle. Some embodiments can thus automate the process of estimating vehicle damage and repair costs from a video of the vehicle, such as those taken at the site of the accident. This can facilitate an end-to-end transformation of the automobile insurance claims processing and can improve both the processing time, consistency and accuracy of claim processing.

Figure 2A:
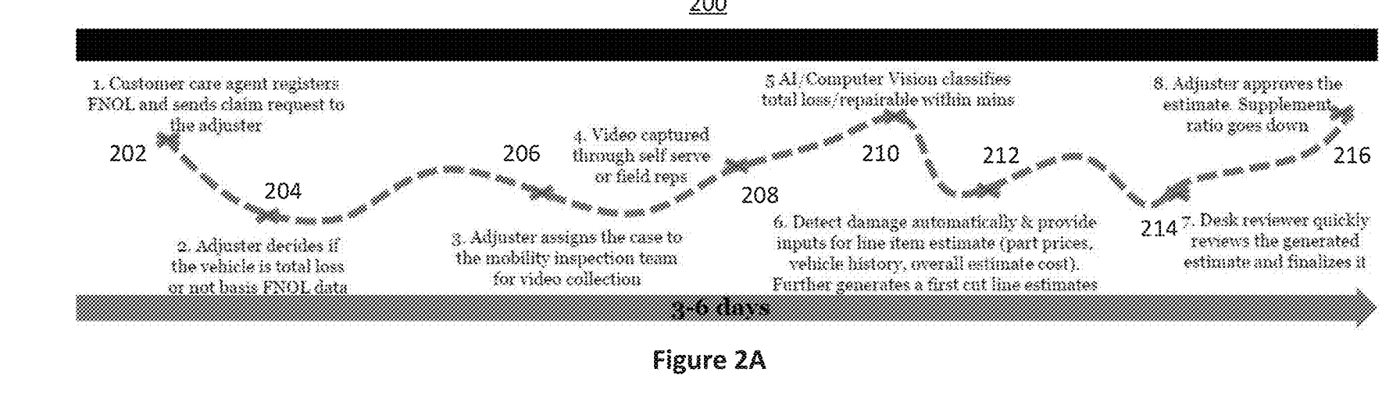
FIGS. 2A and 2B illustrate exemplary artificial intelligence (AI)/machine learning (ML) based processes for assessing damage to a vehicle and for processing vehicle insurance claims, according to some embodiments.

FIG. 2A illustrates the time line of an exemplary artificial intelligence (AI)/machine learning (ML) based process 200 for assessing damage to a vehicle and for processing vehicle insurance claims. In the process 200, the steps 202-206 are the same as steps 102-106 (shown in FIG. 1), respectively. In step 208, a video of the vehicle (structure, in general) taken by the inspector or the user/owner of the vehicle is received. In step 210, an AI/ML system analyzes the video received from the inspector/customer and determines whether the vehicle is a total loss or is repairable, separately from the decision made by a human adjuster in step 204, as described below in further details with reference to FIG. 2B.

In step 212, the AI/ML system analyzes the information about the parts detected to be damaged and the types of damages, and may estimate damage to any internal parts. Using this information, the AI/ML system then generates a list of repairs and replacements that are likely needed and predicts the required time and/or cost for the repairs and/or replacements. The damage analysis and the repair/replacement estimates generated by the AI/ML system are presented in an estimation platform.

In step 214, a reviewer may review the estimates provided by the AI/ML system and the corresponding information, such that the original video, and processed and/or annotated video frames depicting the vehicle. If the reviewer agrees with the estimates, they can be finalized. Otherwise, the reviewer may revise the estimates and this information can be used to train further the AI/ML system. An insurance adjuster may further review the finalized estimates in step 216 and, upon approval, repair/replacement instructions are sent to the user/owner of the vehicle.

Figure 2B:
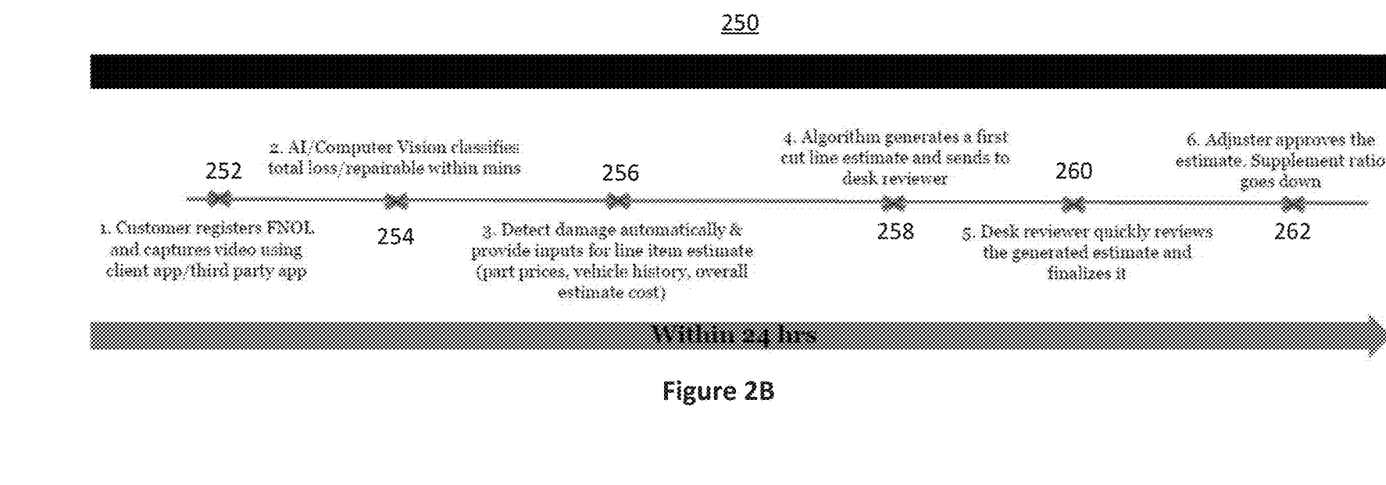

FIG. 2B illustrates the timeline of another exemplary artificial intelligence (AI)/machine learning (ML) based process 250 for assessing damage to a vehicle and for processing vehicle insurance claims. In step 252, a customer captures a video of a vehicle involved in an accident and registers an FNOL, submitting therewith the captured video. A suitable device, such as a smartphone, tablet, digital camera, etc., may be used to capture the video, and it can be sent to the insurance company using an app supplied by the insurance company or using a third-party app.

In step 254, an AI/ML system analyzes the video received from the customer and determines whether the vehicle is a total loss or is repairable. To this end, the AI/ML system performs various machine vison tasks and optional audio processing tasks as described below in further details with reference to FIGS. 4 through 7. The AI/ML system may include more than one system that are trained to perform different tasks. As part of determining whether a vehicle is repairable or not, the AI/ML system may identify various parts of the vehicle (e.g., the hood, a side door, the windshield, etc.) that are damaged. The detected damage can range from minor scratches to crushed or missing parts. This analysis and determination are generally based on frames depicting only the external parts of the vehicle.

In step 256, the AI/ML system analyzes the information about the parts detected to be damaged and the types of damages, and may estimate damage to any internal parts. Using this information, the AI/ML system then generates a list of repairs and replacements that are likely needed and predicts the required time and/or cost for the repairs and/or replacements. In step 258, as part of the overall automation, the damage analysis and the repair/replacement estimates generated by the AI/ML system are presented in an estimation platform. The presentation may include video frames depicting the damage to the vehicle, where such frames are annotated by the AI/ML system, e.g., using bounding boxes or/and pixel level segmentations, to identify the damaged parts and to mark the detected damage. Steps 260 and 262 are the same as steps 214 and 216 (FIG. 2A), respectively.

Figure 3:
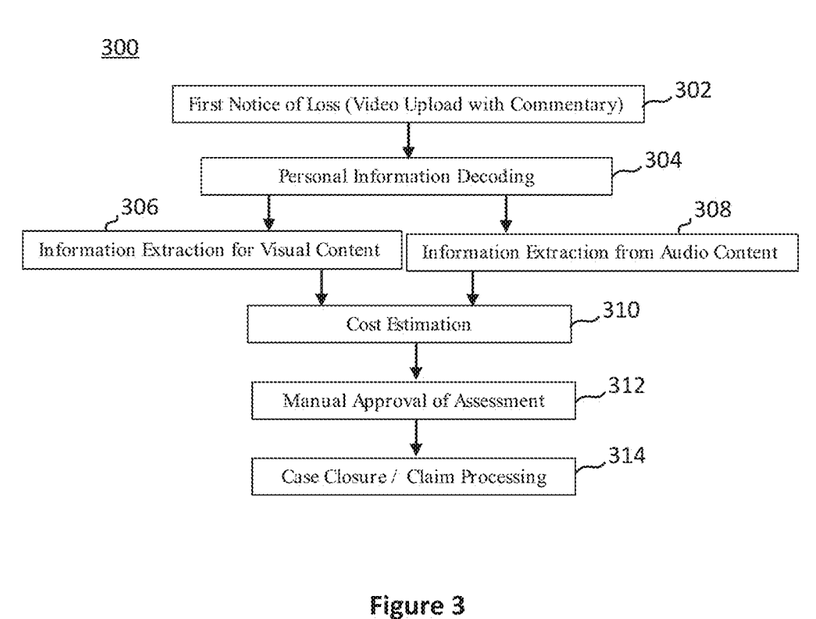
FIG. 3 is a flow chart of the overall process of assessing damage to a structure, according to some embodiments.

FIG. 3 is a flow chart of the overall process 300 of assessing damage to a structure (e.g., a vehicle involved in an accident), according to some embodiments. When a vehicle is involved, unfortunately, in an accident and has visibly distorted or damaged parts, the user (e.g., the driver, owner, a passenger, etc.) records a video of the vehicle, e.g., using a smart device (a smart phone, a tablet, etc.) or a video camera. The video may include visual content only or may also include audio content, e.g., a verbal commentary providing a description of the damaged parts and/or the nature of the damage. The video captures the damages using different zoom factors and angles. In step 302, the user uploads the recorded video (which may but need not include the associated audio), e.g., using a client mobile app, to a server that may be hosted in the cloud, where the content is analyzed using trained AI/ML models. The models may be trained to perform deep learning based computer vision and speech analytics, to detect automatically any damaged part(s) and the damage to such parts, and to assess the severity of the damage.

At step 304, encoded information about the user/owner of the vehicle is obtained or retrieved from the uploaded information, and the user information is decoded so that an insurance claim can be processed. A user's personal information may include meta information about the vehicle such as make, model, year, body type (sedan, truck, hatchback, etc.), odometer reading, license plate no., etc., of the vehicle. Visual content from the captured video is extracted and analyzed (as described with references to FIGS. 4-7) to assess damage to the vehicle, in step 306. In the optional step 308, audio content from the captured video is extracted and analyzed (as described with references to FIGS. 4-7) to assess damage to the vehicle.

The visual and audio assessments may be consolidated, and the costs for repair/replacement of the damaged parts and the total cost of vehicle repair are estimated in step 310. A human review may approve the AI/ML generated assessment in step 312 and, in step 314 the claim may be approved for processing and the case may be closed.

Figure 4:
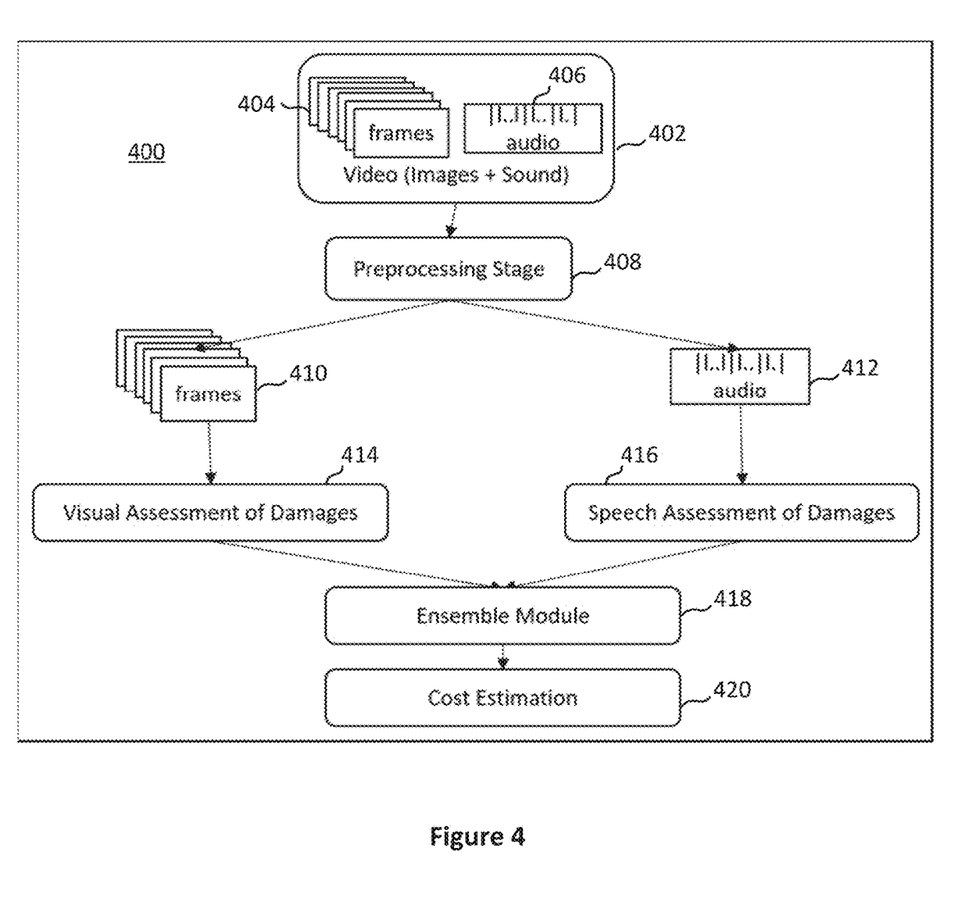
FIG. 4 is a block diagram of a systems for assessing damage to a structure using video of the structure, according to various embodiments.

FIG. 4 is a block diagram of a systems 400 for assessing damage to a structure using video of the structure, according to some embodiments. In the system 400, the damage assessment includes two parallel analyses, one of visual content provided in video content that includes several image frames, and may include one or more images, of the structure and the other of the associated audio content. In some embodiments, however, only the visual content is analyzed and not the audio content. In some cases, no audio content may be provided with the video content.

In the system 400, each analysis includes using multi-step machine learning and/or deep learning models (AI/ML models, in general) for detecting parts of the structure and determining the damage to such part(s), if any. In order to provide robust, accurate AI/ML models, an ideal training data set captures rich variations in damages from different angles, with/without reflections and different lighting conditions. In practice however, obtaining data samples that are sufficient to provide a rich training data set so as to train the AI/ML models for reliable estimation is a huge challenge. Various techniques described herein can address this challenge by consolidating multiple estimations, and by leveraging different models where each one may be trained from limited training data samples/data sets.

The video 402 uploaded by the user (as described above with reference to FIG. 3) includes image frames 404 and audio content 406. The preprocessing stage/module 408 receives the video 402 and prepares its visual and audio (typically speech) contents for analysis and assessment. In particular, the preprocessing stage/module 408 extracts frames 410 from the video 402. This may be achieved by, but is not limited to, down sampling the video 402 at a lower frame rate (e.g., 5, 8, 10, 12, 15, 20, frames per second (fps) as opposed to the original rate of 24, 30, 60 (fps), etc.). The original time stamps in the frames 404 are retained in the extracted frames 410. The down sampling rate is chosen to capture different areas of damage from multiple angles and zoom factors while minimizing the computational requirements. A combination of intra and inter frames can also be chosen to minimize the computation requirements.

As opposed to the traditional approach of estimating damage from a few images, the video-based assessment can help in mitigating the risk of missing one or more damaged areas and/or misclassification of a damaged area. In the traditional approach, such errors can occur due to light variations while capturing the images and reflections in captured images. In the system 400, although the preprocessing stage/module 408 does not select each and every frame of the video 402 for further processing, the down-sampling rate can be selected such that variations in lighting are captured in different frames 410 associated with the same part. Likewise, at least some selected frames 410 associated with a part may be free of any unwanted reflections.

The preprocessing stage/module 408 may optionally extract the corresponding speech content 412 from the original video 402. Signals processing and/or filtering techniques may be employed to extract a user's voice accounting for variability in the speech/audio signals as different speakers may have different accents, dialects, pronunciations, rates of speaking, and emotional states. The presence of outside noise, reverberation, and usage of different recording devices can result in additional variability and complexity in the recoded audio 406. Some embodiments compensate for such variations using a layer of noise suppression, e.g., by removing Gaussian noise outside of the human audible frequency range (e.g., 0-4 kHz, 0-10 kHz, 0-20 kHz, etc.).

After the pre-processing, an AI/ML model is used by the visual assessment module 414. The visual assessment module 414 may include one or more processors that are configured using the AI/ML model (e.g., a deep learning model), where the model is trained to detect damaged structure parts from the selected video frames 410, and to assess the scope of damage to such part(s). The system 400 also includes a speech assessment module 416 that analyzes the extracted speech content 412. The speech assessment module is optional. Speech analysis can identify any damaged parts and the nature of the damage thereto independently of the visual assessment module 414.

The ensemble module 418 consolidates the inferences drawn by the visual assessment module 414 and the speech assessment module 416. For example, the visual assessment module draw an inference that the front right of the hood of a car has dents. An inference from the speech assessment module 416 of damage to the hood can confirm, at least in part, the inference drawn by the visual assessment module 414. In some cases, the inferences from the two modules 414, 416 can identify a discrepancy. For example, the speech assessment module 416 may additionally infer damage to the right portion of the front fender, but the visual assessment module 414 may not draw a corresponding inference.

In general, the ensemble module 418 may assign different scores to the different inferences, where a high score indicates a greater confidence in the correctness of the inference. The cost estimation module 420 receives the consolidated inferences and associated scores. Using historical data and/or external databases, the cost estimation module 420 determines the cost of repairs to the identified part(s) and/or replacement of the part(s), as needed.

Figure 5:
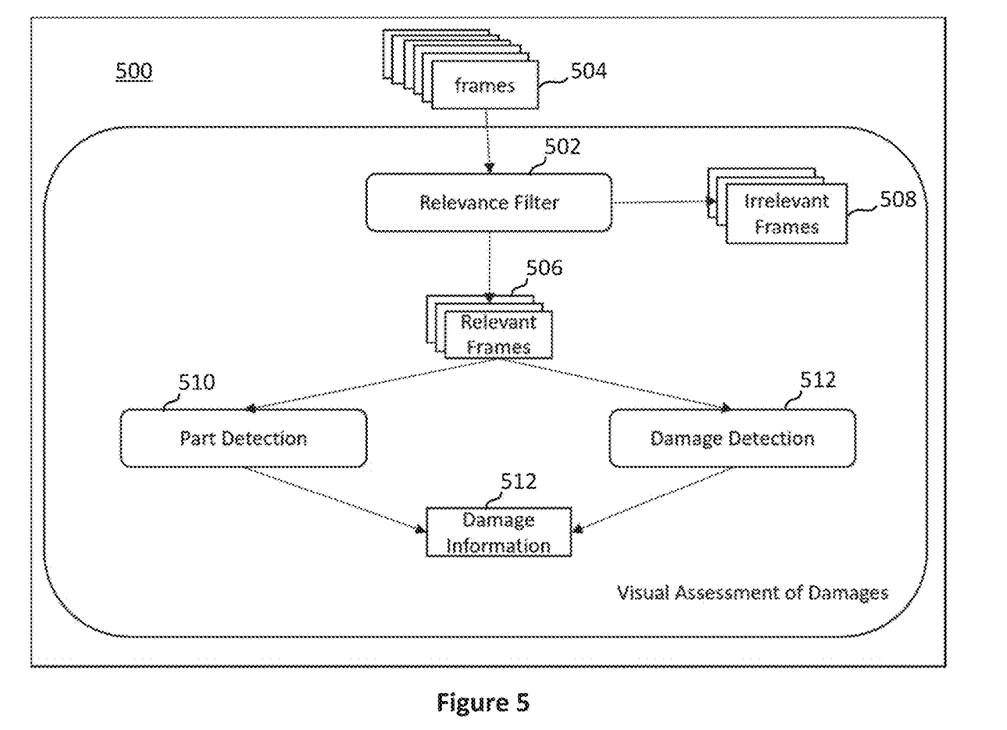
FIG. 5 is a flow chart of a process for assessing damage to a structure using video of the structure, according to various embodiments.

FIG. 5 is a flow chart of a process 500 for assessing damage to a structure using visual content extracted from a video of the structure, according to various embodiments. The visual assessment module 414 can implement the process 500 (also referred to as the visual assessment pipeline). The process 500 includes three major steps or stages, as follows.

The first step, relevance classification or filtering, 502, receives the selected/down-sampled frames 504 (e.g., the frames 410 shown in FIG. 4), and separates the relevant frames 506 from the irrelevant frames 508. The video frames that likely indicate or inform of potential structure's presence are designated as relevant frames 506. Other frames, e.g., frames that do not include the vehicle (structure, in general) for which the damage is to be assessed, or where only a small portion of the frame (e.g., less than 50%, 20%, 10%, etc.) depicts the vehicle, or frames that show only the interior of the vehicle, may be designated as irrelevant frames 508.

Such filtering can enhance the speed and/or accuracy of downstream processing. The filtering step 502 may be implemented using AI/ML-based filtering models. Examples of such models include ensemble models developed using transfer learning with backbone classification techniques such as Inception, Xception, ResNet, etc., or other deep learning architectures.

In an Inception network, the convolution layer of a convolutional neural network (CNN) simultaneously employs several convolution filters (also called kernels) of different sizes (3×3; 5×5, etc.) and may optionally include max-pooling, increasing the accuracy of the classifier. The Xception network is a variation of the Inception network, where the convolutions are performed in a depthwise separable manner. The ResNet is a type of a CNN where the convolution of some blocks of an image represented by a frame is omitted and that block is simply forwarded to the next layer of the CNN. This can also improve the accuracy of the classifier.

In one example, the filtering model used in the step 502 was trained using approximately 1500 images and various hyperparameters were used to tune the model, which helped to remove frames that did not depict exterior parts of a vehicle. By using filtered, relevant frames 506, as opposed to using all frames 504, in training and/or inferencing, part detection and identification (discussed below) can be performed with accuracy as high as 96%. Likewise, damage detection and classification between severe damage and moderate or minor damage (also discussed below) can be performed with accuracy as high as 80%.

The second step 510 performs part detection using image segmentation. The relevant frames 506 can provide a spatial variance in the views of the vehicle (the structure to be assessed, in general) in terms of different viewing angles and/or different zoom factors. This can provide rich frame data capturing parts of the vehicle that may be similar to the parts represented in the limited training data set.

The part detection step 510 detects all the external vehicle parts that are visible in the relevant frames 506. To this end, some embodiments use a deep-learning based image segmentation model trained from DeepLabv3+ architecture employing the Xception and/or ResNet backbones. Specifically, the part detection step 510 performs semantic segmentation to identify part level information at pixel level. The segmentation may mark the detected/identified part using a bounding box.

In one example, the image segmentation for part detection model was trained using approximately 500 labeled images. Typically, a randomly selected training set of 500 images, even with augmentation, does not capture all the different variations in which a vehicle part may be seen in images. As such, in general, such a training data set, when used to train an AI/ML module, does not yield a robust model for accurate part detection and classification.

In various embodiments described herein, the use of selected down-sampled frames 504 that are obtained from a video increases the likelihood of capturing depictions of every vehicle part with variations in viewing angles and/or zoom factors. Using the selected down-sampled frames 504 for inferencing, it was observed that vehicle part identification and detection can be performed with high accuracy due to the use of several frames captured from a video of the vehicle. Specifically, in some experiments, the vehicle part segmentation and identification accuracy, as indicated by the segmentation quality metric mean intersection over union (mIoU) score, was 0.71. An mIoU score of 0.5 and above is generally considered to be a good segmentation score.

The third step, 512, performs damage detection by applying image segmentation to the relevant frames 506. In various embodiments, using multiple frames can enhance the probability of finding similar damage within a limited training data set and, can thus improve damage detection. Moreover, the estimation of damage to different parts of a vehicle (a structure, in general) can also be improved using several relevant frames 506, because some of these frames may be free of one or more of unwanted artifacts such reflections, effects of uneven lighting (e.g., shadows, inadequate lighting, etc.), inadequate zoom factor, etc.

In some embodiments, damage detection and classification are performed in a hierarchical manner. First, the detected damage is classified between two classes: (A) severe damage to a part; and (B) moderate or minor damage to a part. In some embodiments, this classification task is performed using a deep learning model based on the ResNet architecture trained on a training data set of approximately 900 images of vehicles labeled with the levels of severity of damage to part(s) of the vehicle depicted in the image. In some experiments, the accuracy of this classification was as high as 80%. The segmentation may mark the detected/identified damaged area or region of the structure using a bounding box.

In the hierarchical damage classification, frames depicting severely damaged part(s) are excluded from further damage classification. It is indicated to the cost estimation module 420 (FIG. 4) that the damaged part(s) be replaced rather than repaired. After filtering out the severely damaged parts, moderate or minor damages are classified further in the frames that are not filtered out. The damage depicted in these frames is classified further into damage categories such as scratch, dent, missing part, tear, crush, misalignment, etc.

Specifically, damage depicting areas in each frame that is not filtered out are localized using an image segmentation model at pixel level. In some embodiments, the segmentation model is trained using a training data set of approximately 2000 images, where the model is a deep learning model based on DeeplabV3+, with the Xception network as a backbone. In one experiment, classification using the trained segmentation model resulted in a reasonable mIoU of 0.62.

The part identification information provided by the step 510 and the damage classification provided by the step 512 are provided together as damage information 512. Thus, the damage information 512 indicates the part(s) that are damaged and the nature/severity of the damage to each damaged part. For a vehicle, for example, the parts may include fenders, bumpers, hood, grill, rear gate, doors, side mirrors, wheels, etc. The nature of damage to each part in the damage information 512 can be, ranked from the most severe to the least sever as: crush or crumple; missing part; misaligned part; loose part; tear or hole; dent; glass break; and scratch, etc.

One benefit of the technique described herein is that the part detection and identification (also referred to as part classification) and/or damage detection are performed using not just one image but using several relevant frames 506. Some of these frames can yield a more accurate determination than other frames. As such, in some embodiments, a confidence score is provided for each type of estimation, i.e., part detection and damage detection. A final inference of a damaged part and the type/severity of the damage may include a weighted average of the respective inferences derived from several frames. The weights can be the respective confidence scores of the individual inferences, indicative of the respective likelihoods that the inferences are accurate.

In some cases, the final inference may be a simple average of the individual inferences derived from several frames. The final inference can also be a consensus of the individual inferences derived from different frames (or frame subsets), where all or a specified minimum number of individual inferences must be in agreement. The minimum number can be specified as an absolute number, e.g., 2, 3, 5, etc., or, it can be a specified as a percentage of the total number of inferences, e.g., 75%, 80%, 90%, etc. In some cases, the final inference can be derived as a majority of the individual inferences. The final inference aggregated in any of these manners often yields highly accurate part and corresponding damage estimates. Such final inferences may be provided for several vehicle parts. The final output from the visual assessment process 500 can provide an overall damage assessment for the vehicle (a structure, in general), with a part level granularity.

Figure 6:
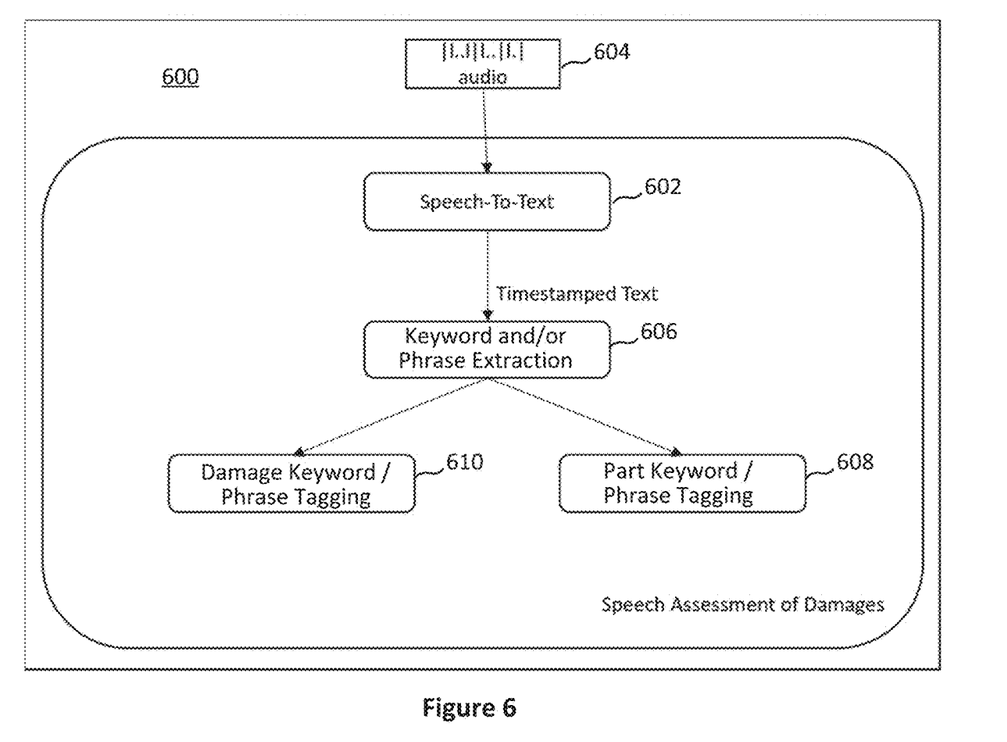
FIG. 6 is a flow chart of a process for assessing damage to a structure using audio associated with a video of the structure, according to various embodiments.

FIG. 6 is a flow chart of a process 600 for assessing damage to a structure using audio associated with a visual content in a video of the structure, according to some embodiments. The audio content may not always be available and, it may not be used even when available, because the audio content, which may include commentary by the vehicle user/owner may include biased information. Nevertheless, the use of this information can improve the quality of overall assessment.

In step 602, the noise suppressed audio content 604 is received from the pre-processing stage (e.g., the audio content 412 provided by the pre-processing module 408 shown in FIG. 4). In step 602, the audio content 604 is converted to text using a speech-to-text engine. In step 606, the generated text is contextually parsed using computation linguistic techniques and stored for every specified time window (e.g., 5, 10, 12 seconds, etc.) of the corresponding extracted video content (e.g., the frames 410 shown in FIG. 4). A window of a specific duration is chosen to identify precisely the time stamps in the video content and to synchronize the generated text with the frames (e.g., the frames 410 shown in FIG. 4) used in visual assessment. Based on the contextual content parsing, various keywords and/or phrases in the speech that may be relevant to the detection of parts and/or damage are identified in the step 606.

In step 608, the identified keywords and/or phrases are matched with a parts dictionary, to detect vehicle parts (structure parts, in general) such as door, headlight, etc., that are described in the speech. In step 610, the identified keywords and/or phrases are matched with a damage-types dictionary, to detect the different types of damages, such as dents, scratches, missing parts, etc., that are described in the speech. The detection (also called tagging) of parts in the step 608 and/or the detection or tagging of damage types in the step 610 can be enhanced by evaluating synonyms of parts and/or damage types during the respective matching steps 608, 610.

In each of the steps 608, 610, a respective contextual classification model may be used to refine further the damage assessment as all body parts mentioned in the speech may not corresponds to damaged area and vice versa. The classification model can enhance the precision by contextually decoding the information, where the model determines whether a part and damage thereto are described in the same context. For example, the speech may include statements such as "large dent on the left rear door" and "broken handle on the left front door."

Figure 7:
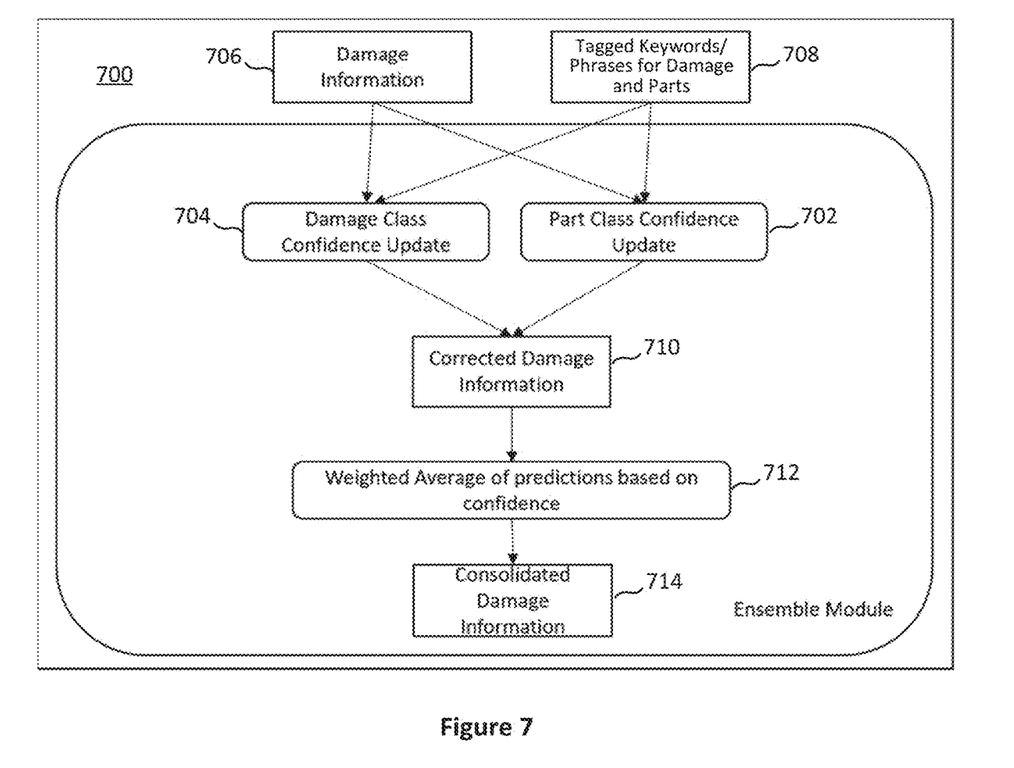
FIG. 7 illustrates a system and a process for assessing damage to a structure using a video of the structure and the associated audio, according to various embodiments.

FIG. 7 illustrates a system 700 and the corresponding process for assessing damage to a structure using a video of the structure and the associated audio, which may be included in the video or may be a separate audio stream, according to some embodiments. The parts identification/classification update module 702 receives damage information 706 (e.g., the damage information 512 shown in FIG. 5) that is generated by the visual assessment module (e.g., the module 414 shown in FIG. 4). Rather than receiving the final inference of the damage information, which may be derived by aggregating individual inferences drawn from respective frames (or groups of frames) as described above, the module 702 may receive individual inferences as the damage information 706.

The parts identification/classification update module 702 also receives the keywords and/or phrases tagged for damage and parts 708 (such as those produced in the steps 608, 610 shown in FIG. 6) that may be generated by the speech assessment module (e.g., the module 416 shown in FIG. 4). Different sets of tagged keywords and/or phrases may correspond to different parts of the speech that correspond to different frames (or frame groups). The correspondence between the keyword sets and frames (or frame groups) can be determined from the fame and speech time stamps. The damage classification update module 704 also receives the damage information 706 and the keywords tagged for damage and parts 708.

In general, the ensemble of visual and speech assessments can ingest more robustness to the inferences drawn by the system 700. The ensemble is auto adjusted based on the insights generated from both visual and audio channels. Often, the information extracted from the speech analysis is subjective and may not be accurate because the user providing the information may be biased. On the other hand, the user recording the video and audio is observing the vehicle (structure, in general) and, if the user is not biased, the information he or she provides can be highly accurate.

As such, the audio information can enhance the visual assessment, as appropriate. For example, if the speech content is not clear, the system 700 may rely only on the visual assessment. On the other hand, the tagged keywords and/or phrases, such as "loose grill" can be used to increase the confidence in the same inference drawn from visual assessment. In this, the parts identification/classification update module 702 may increase the confidence score associated with the part identified as damaged (e.g., the grill). Additionally, or in the alternative, the damage classification update module 704 may increase the confidence score associated with the identified type of damage (e.g., misaligned part).

In some cases, if the tagged keywords and/or phrases 708 are consistent with several but not all inferences included in the damage information 706, the modules 702 and/or 704 may decrease the confidence scores for the inferences in the damage information 706 that are not corroborated by the tagged keywords and/or phrases 708. These updates provide corrected damage information 710.

The aggregation module 712 then aggregates the corrected damage information 710 corresponding to each frame (or frame group). As described above, some of the frames in the original video can yield a more accurate determination than other frames. The aggregation module 712 generates a final inference of a damaged part and the type/severity of the damage. In some cases, the aggregation is based on a weighted average of the respective inferences derived from several frames. The weights can be the respective confidence scores of the individual inferences, as updated by the modules 702, 704. The final consolidated damage information 714, for one or more parts, can be highly accurate and may be used to obtain the cost of repair and replacement, if needed.

Figure 8:
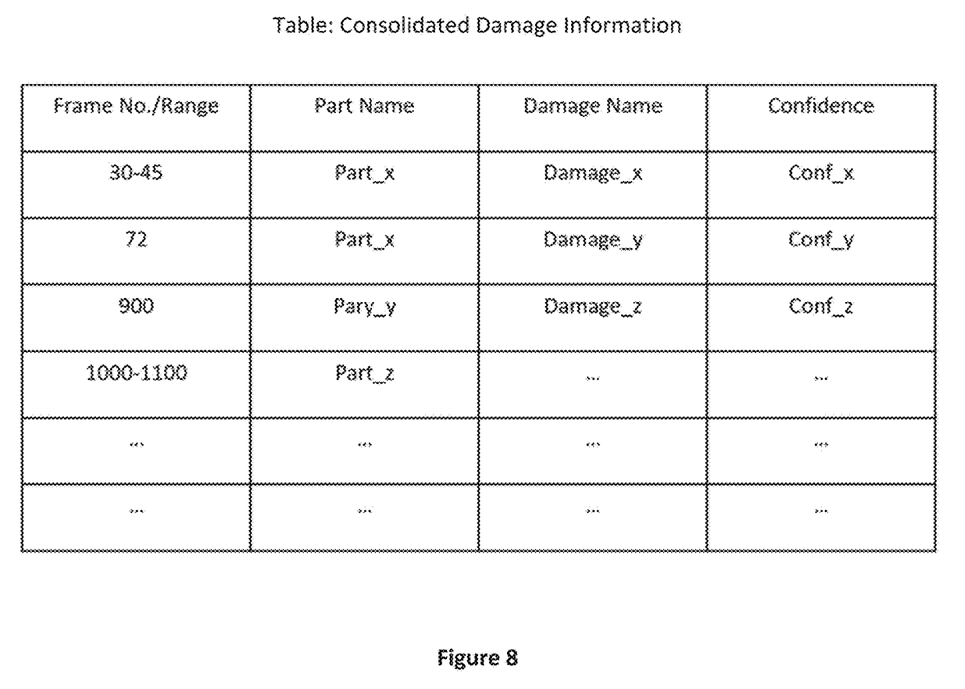
FIG. 8 shows an exemplary table of consolidated damage information that can be used to estimate the repair and/or replacement cost, according to various embodiments.

FIG. 8 shows an exemplary table of consolidated damage information that can be used to estimate the repair and/or replacement cost, according to various embodiments. In the table, the column labeled "Frame No./Range" identifies a particular frame or a set of frames based on which parts and damage information is derived. The columns labeled "Part Name" and "Damage Name" describe the part found to be damaged by analyzing the frame or set of frames identified in the corresponding column and the type of the damage. A confidence score for the inference is provided in the column labeled "Confidence."

The values provided in the columns "Part Name," "Damage Name," and "Confidence" can be consolidated values, i.e., the respective values can be based on a weighted average (as described above) of individual inferences, where each individual inference can be derived from a sub-range of frames identified in the corresponding Frame No/Range column. For example, an inference such as "Part_x," "Damage_x," or "Conf_x" may be a weighted average of two individual inferences, one based on frames 30-38 and the other based on frames 39-45. Each of these frame groups in the frame set 30-45 may depict the same part but from a different angle and/or using a different zoom factor.

In some embodiments, the damage estimate for a vehicle is processed in conjunction with certain additional information about the vehicle by a probabilistic model that can predict line estimate for the repairs/replacement. For example, the cost estimate to repair both types of damages to Part_x or to replace Part_x may be provided by the model. The model may take into account the cost of the required materials and the expected labor and/or paint hours. Having multiple frames or frame groups corresponding to single viewing angle, a single zoom factor, several different viewing angles (including a 360 degree view of the vehicle (structure, in general), and several different zoom factors can improve the accuracy of the damage estimate and, accordingly, the accuracy of the cost estimate.

In some embodiments, feedback on the damage and/or cost estimates is sent to the user, along with portions of the video used for the assessment. The user may then record another video if the user finds the damage estimate to be erroneous and/or incomplete. The damage estimate can be revised using the later obtained video. The client app installed on a user device can be configured for secure exchange of videos and damage and cost estimates, minimizing the chances of a user uploading adulterated videos or frame for false insurance claims. As such, the insurance provider may find the systems and methods described herein as providing authentic information and, hence, trustworthy.

In various embodiments, the AI/ML based video analysis and inferencing technique described herein can increases the accuracy and/or efficiency of both (a) assessing damage to structures, and (b) identifying remedial measures to repair the damage. As one example, this is beneficial to insurance companies and their customers by facilitating faster than convention and more accurate insurance claims processing, decreasing the cycle time for processing claims from 5-10 days to just a few hours or even in near-real time (e.g., in a few minutes). This can be done without having to wait to hire and train new human assessors and adjustors while ensuring consistency across claims. Other examples include efficient maintenance of industrial plants, where different types of machinery can become damaged over time, e.g., due to exposure to extreme weather conditions, radiation, etc.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for assessing damage to a structure, the method comprising:
   training a first machine learning (ML) module to identify external parts of various structures from video frames of a first plurality of videos of the various structures;
   training a second ML module to detect and classify damaged regions of the various structures from video frames of a second plurality of videos of the various structures;
   dividing a video of a structure into a plurality of subsets of video frames, each of the plurality of subsets of video frames associated with a different window of time within the video;
   generating text from audio content associated with the video of the structure;
   using the first ML module to detect one or more external parts of the structure from a subset of video frames associated with each applicable window of time;
   using the second ML module to determine and classify one or more damaged regions of the structure from the subset of video frames associated with each applicable window of time;
   identifying a portion of the text associated with the subset of video frames based on the applicable window of time;
   determining whether the identified portion of the text corroborates a result of the damaged regions of the structure determined and classified using the second ML module; and
   in response to determining that the identified portion of the text corroborates the result, associating the damaged regions with the external parts to provide a respective vision-based damage estimate for each of the external parts.

2. The method of claim 1, wherein at least one of the first ML module or the second ML module is trained to perform pixel level segmentation, wherein the segmentation marks an external part or a damaged region using a bounding box.

3. The method of claim 1, further comprising
   selecting frames from the plurality of subsets of video frames via down-sampling the video.

4. The method of claim 3, further comprising using a classifier to partition the selected frames into relevant frames and non-relevant frames, the relevant frames being associated with at least a portion of the structure, and the non-relevant frames being devoid of a significant portion of the structure.

5. The method of claim 4, wherein:
the relevant frames comprise a first relevant frame and a second relevant frame;
a first viewing angle is associated with the first relevant frame, and a second viewing angle is associated with the second relevant frame; or
a first zoom factor is associated with the first relevant frame, and a second zoom factor is associated with the second relevant frame.

6. The method of claim 4, wherein the relevant frames comprise a first subset of relevant frames and a second subset of relevant frames, and the method comprises:
deriving, using the first subset of relevant frames, a first damage estimate identifying a part and a damage type;
deriving, using the second subset of relevant frames, a second damage estimate identifying the part and the damage type; and
aggregating the first and second damage estimates to provide a final vision-based damage estimate.

7. The method of claim 6, wherein:
aggregating the first and second damage estimates comprises computing an average of the first and second damage estimates or a consensus of the first and second damage estimates.

8. The method of claim 6, wherein the set of relevant frames comprise a third subset of relevant frames, and the method comprises:
deriving, using the third subset of relevant frames, a third damage estimate identifying the part and the damage type; and
aggregating the first, second, and third damage estimates to provide the final vision-based damage estimate,
wherein aggregating the first, second, and third damage estimates comprises computing an average, a consensus, or a majority of the first, second, and third damage estimates.

9. The method of claim 6, wherein:
the first damage estimate is associated with a first confidence score;
the second damage estimate is associated with a second confidence score; and
aggregating the first and second damage estimates comprises computing a weighted average of the first and second damage estimates based on the first and second confidence scores.

10. The method of claim 1, further comprising:
extracting and translating the audio content into the text;
identifying relevant keywords or phrases from the text;
associating the keywords or phrases with part names and damage types to obtain respective audio-based damage estimates for the one or more external parts; and
consolidating the final vision-based damage estimate and the audio-based damage estimates to provide a consolidated damage estimate.

11. The method of claim 1, wherein the second ML module is trained to perform segmentation based on a plurality of classes of damage types, the damage types comprising scratch, dent, tear, hole, misaligned part, missing part, crumple, or crush damage.

12. The method of claim 1, further comprising:
generating a cost estimate for repair or replacement of at least one of the one or more external parts.

13. A system for assessing damage to a structure, the system comprising:
a processor; and
a memory in communication with the processor and comprising instructions which, when executed by the processor, program the processor to:
train a first machine learning (ML) module to identify external parts of various structures from video frames of a first plurality of videos of the various structures;
train a second ML module to detect and classify damaged regions of the various structures from video frames of a second plurality of videos of the various structures;
divide a video of a structure into a plurality of subsets of video frames, each of the plurality of subsets of video frames associated with a different window of time within the video;
generate text from audio content associated with the video of the structure;
use the first ML module to detect one or more external parts of the structure from a subset of video frames associated with a different window of time within the video;
use the second ML module to determine and classify one or more damaged regions of the structure from the subset of video frames associated with each applicable window of time;
identify a portion of the text associated with the subset of video frames based on the applicable window of time;
determine whether the identified portion of the text corroborates a result of the damaged regions of the structure determined and classified using the second ML module; and
in response to determining that the identified portion of the text corroborates the result, associate the damaged regions with the external parts to provide a respective vision-based damage estimate for each of the external parts.

14. The system of claim 13, wherein at least one of the first ML module or the second ML module is trained to perform pixel level segmentation, wherein the segmentation marks an external part or a damaged region using a bounding box.

15. The system of claim 13, wherein the instructions further program the processor to
select of frames from the plurality of subsets of video frames via down-sampling the video.

16. The system of claim 15, wherein the instructions further program the processor to use a classifier to partition the selected frames into relevant frames and non-relevant frames, the relevant frames being associated with at least a portion of the structure, and the non-relevant frames being devoid of a significant portion of the structure.

17. The system of claim 16, wherein:
the relevant frames comprise a first relevant frame and a second relevant frame;
a first viewing angle is associated with the first relevant frame, and a second viewing angle is associated with the second relevant frame; or
a first zoom factor is associated with the first relevant frame, and a second zoom factor is associated with the second relevant frame.

18. The system of claim 16, wherein:
the relevant frames comprise a first subset of relevant frames and a second subset of relevant frames; and the instructions further program the processor to:
  derive, using the first subset of relevant frames, a first damage estimate identifying a part and a damage type;
  derive using, the second subset of relevant frames, a second damage estimate identifying the part and the damage type; and
  aggregate the first and second damage estimates to provide a final vision-based damage estimate.

19. The system of claim 18, wherein to aggregate the first and second damage estimates, the instructions program the processor to compute: (i) an average of the first and second damage estimates, or (ii) a consensus of the first and second damage estimates.

20. The system of claim 18, wherein:
  the relevant frames comprise a third subset of relevant frames; and
  the instructions further program the processor to:
    derive using the third subset of relevant frames a third damage estimate identifying the part and the damage type; and
    aggregate the first, second, and third damage estimates to provide the final vision-based damage estimate, wherein to aggregate the first, second, and third damage estimates, the instructions program the processor to compute: (i) an average, (ii) a consensus, or (iii) a majority of the first, second, and third damage estimates.

* * * * *